US011177079B2

(12) United States Patent
Suh et al.

(10) Patent No.: US 11,177,079 B2
(45) Date of Patent: Nov. 16, 2021

(54) AQUEOUS ELECTROLYTE AND PSEUDOCAPACITOR COMPRISING SAME

(71) Applicant: LG Chem, Ltd., Seoul (KR)

(72) Inventors: Donghoon Suh, Daejeon (KR); Seokhyun Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/764,811

(22) PCT Filed: Aug. 12, 2019

(86) PCT No.: PCT/KR2019/010188
§ 371 (c)(1),
(2) Date: May 15, 2020

(87) PCT Pub. No.: WO2020/045853
PCT Pub. Date: Mar. 5, 2020

(65) Prior Publication Data
US 2020/0357579 A1 Nov. 12, 2020

(30) Foreign Application Priority Data

Aug. 29, 2018 (KR) .................. 10-2018-0101953
Aug. 9, 2019 (KR) .................. 10-2019-0097202

(51) Int. Cl.
*H01G 11/60* (2013.01)
*H01G 11/62* (2013.01)
*H01G 11/64* (2013.01)

(52) U.S. Cl.
CPC ............. *H01G 11/60* (2013.01); *H01G 11/62* (2013.01); *H01G 11/64* (2013.01)

(58) Field of Classification Search
CPC ......... H01G 11/60; H01G 11/62; H01G 11/64
See application file for complete search history.

(56) References Cited

U.S. PATENT DOCUMENTS

| 4,631,240 A | 12/1986 | Walsh |
| 5,900,182 A * | 5/1999 | Kanbara ............... H01M 6/181 252/62.2 |
| 5,916,475 A | 6/1999 | Michot |

(Continued)

FOREIGN PATENT DOCUMENTS

| CN | 103310987 A | 9/2013 |
| CN | 105103349 A | 11/2015 |

(Continued)

OTHER PUBLICATIONS

Xu Peng, et al., "A zwitterionic gel electrolyte for efficient solid-state supercapacitors", Nature Communications, vol. 7, Article No. 11782, May 26, 2016.

(Continued)

*Primary Examiner* — Dion Ferguson
(74) *Attorney, Agent, or Firm* — Dentons US LLP (57) ABSTRACT

An aqueous electrolyte for a pseudo-capacitor and a pseudo-capacitor comprising the same, and more particularly an aqueous electrolyte for a pseudo-capacitor comprising an aqueous solvent, and a certain concentration or more of a lithium salt and a zwitterionic compounds, and a pseudo-capacitor comprising the aqueous electrolyte described above.

11 Claims, 10 Drawing Sheets

(56) References Cited

U.S. PATENT DOCUMENTS

| | | | | |
|---|---|---|---|---|
| 2011/0151317 A1* | 6/2011 | Giroud | ............. | H01M 10/0567 429/162 |
| 2011/0242733 A1* | 10/2011 | Dombro, Jr. | ........... | H01G 9/035 361/504 |
| 2013/0242464 A1* | 9/2013 | Biler | ...................... | H01G 9/035 361/504 |
| 2014/0159668 A1 | 6/2014 | Whitacre et al. | | |
| 2016/0028112 A1 | 1/2016 | Zhong et al. | | |
| 2016/0079007 A1 | 3/2016 | Otsuka et al. | | |
| 2018/0204686 A1* | 7/2018 | Yamauchi | ............... | H01G 11/84 |
| 2018/0269529 A1* | 9/2018 | Yuyama | ................ | H01M 12/06 |
| 2018/0309114 A1* | 10/2018 | Che | .................. | H01M 10/4242 |
| 2019/0036167 A1 | 1/2019 | Yamaguchi et al. | | |
| 2020/0328471 A1* | 10/2020 | D'Angelo | .............. | H01G 11/56 |

FOREIGN PATENT DOCUMENTS

| | | |
|---|---|---|
| CN | 105190778 A | 12/2015 |
| CN | 106299493 A | 1/2017 |
| CN | 106816643 A | 6/2017 |
| CN | 107216467 A | 9/2017 |
| EP | 3278389 A | 2/2018 |
| JP | 2001-155541 A | 6/2001 |
| JP | 2018-520497 A | 7/2018 |
| KR | 10-2012-0012584 A | 2/2012 |
| KR | 10-2014-0081276 A | 7/2014 |
| KR | 10-2015-0104100 A | 9/2015 |
| KR | 10-2015-0135207 A | 12/2015 |
| KR | 10-2017-0116314 A | 10/2017 |
| KR | 10-2018-0041150 A | 4/2018 |
| WO | 2008020649 A1 | 2/2008 |
| WO | 2016156451 A1 | 10/2016 |

OTHER PUBLICATIONS

Krishnan, et al. (2008).Organic Solvents Containing Zwitterion as Electrolyte for Li Ion Cells. Bull. Korean Chem. Soc. vol. 29, No. 9.

Churat Tiyapiboonchaiya et al., "The Zwitterion effect in high-conductivity polyelectrolyte materials", vol. 3, No. 1, Published online—Dec. 21, 2003, London, XP 55222644 A: (4 Pages).

* cited by examiner

AQUEOUS ELECTROLYTE AND PSEUDOCAPACITOR COMPRISING SAME

The present application is a National Phase entry pursuant to 35 U.S.C. § 371 of International Application No. PCT/KR2019/010188 filed on Aug. 12, 2019, and claims priority to and the benefit of Korean Patent Application No. 10-2018-0101953 filed on Aug. 29, 2018 and Korean Patent Application No. 10-2019-0097202 filed on Aug. 9, 2019, the contents of which are incorporated herein by reference in their entirety.

FIELD

The present invention relates to an aqueous electrolyte for a pseudo-capacitor comprising a certain concentration or more of a lithium salt and a zwitterionic compounds to improve the low temperature stability of the electrolyte, and a pseudo-capacitor comprising the aqueous electrolyte described above.

BACKGROUND

All of the next generation energy storage systems being developed recently utilize electrochemical principles, and are represented by a lithium (Li) based secondary battery and an electrochemical capacitor. The secondary battery is superior in terms of amount of energy (energy density) that can be accumulated per unit weight or volume, but still shows a lot of room for improvement in terms of duration of use, charging time, and amount of energy (power density) available per unit time.

The electrochemical capacitor is inferior to the secondary battery in terms of energy density, but shows superior characteristics compared to the secondary battery in terms of duration of use, charging time, and power density. Accordingly, in the case of the electrochemical capacitor, research and development are being actively conducted to improve energy density.

In particular, supercapacitors are energy storage power source devices with unique performance characteristics in the areas which are not available with conventional electrolytic capacitors and new secondary batteries. These supercapacitors are divided into electrical double layer capacitors (EDLC) using the principle of electrical double layer and pseudo-capacitors using the principle of electrochemical faradaic reaction according to the electrochemical electrical storage mechanism.

The electric double layer capacitor utilizes the ions of the electrolyte solution to be physically adsorbed and desorbed while forming an electric double layer on the electrode surface, and has excellent power density due to the development of pores on the carbon surface used as electrodes. However, there is a disadvantage that since charges are accumulated only on the electrical double layer on the surface, the energy density is low because the electric storage capacity is lower than that of the metal oxide-based or electrically conductive polymer-based supercapacitor using the faradaic reaction.

Metal oxide-based supercapacitor using a pseudo-capacitor is a capacitor that uses metal oxides with multiple atomic valences capable of being oxidized and reduced. The reason why it is called pseudo-capacitor is that the characteristics of the capacitor are generally due to the formation of the electric double layer like the electric double layer capacitor but some metal oxides generate capacitor characteristics instead of battery characteristics. However, electrochemical reactions generally make it difficult to generate capacitor-like characteristics. The supercapacitor of the metal oxide electrode using such pseudo-capacitor shows the accumulation mechanism by which protons move by oxidation and reduction reactions of the metal oxide, so it has higher specific electric storage capacity than the electric double layer capacitor. In addition, in the case of the electrode active material of the metal oxide-based supercapacitor, since the ions and electrons required for oxidation and reduction must move at high speed in the electrolyte and the electrode during charging/discharging, it is desirable that the electrode interface has a high specific surface area, and the electrode active material requires high electrical conductivity.

Meanwhile, in general, electrolytes used in capacitors are classified into aqueous electrolytes, non-aqueous electrolytes, and solid electrolytes. Non-aqueous electrolytes generally have a higher viscosity than aqueous electrolytes, and have conductivity as low as $1/10$ to $1/100$ times that of aqueous electrolytes. Accordingly, if an aqueous electrolyte is used, there is an advantage that the internal resistance of the electrolyte is reduced and the output characteristics of the capacitor are improved.

However, since the freezing point (melting point) of the electrolyte is relatively higher than that of the non-aqueous electrolyte, when an aqueous electrolyte is exposed to a low temperature environment, freezing of the electrolyte may occur, which causes a problem in that the utilization range is considerably reduced.

PATENT DOCUMENT

Korean Laid-open Patent Publication No. 2014-0081276 (2014 Jul. 1), "Lithium ion capacitor".

SUMMARY

In order to solve the above problems, as a result of various studies to improve the low temperature stability of the pseudo-capacitor, the inventors of the present invention have confirmed that if a certain concentration, or more, of a lithium salt and a zwitterionic compound are added to the aqueous electrolyte of the capacitor, the electrolyte is not frozen even in a cryogenic environment, and the stable operation of capacitor is possible, and thus have completed the present invention.

Therefore, it is an object of the present invention to provide an aqueous electrolyte for a pseudo-capacitor with improved low temperature stability.

In addition, it is another object of the present invention to provide a pseudo-capacitor with improved cryogenic stability and excellent charging/discharging efficiency, energy density and power density comprising the aqueous electrolyte described above.

In order to achieve the above objects, the present invention provides an aqueous electrolyte for a pseudo-capacitor comprising an aqueous solvent, a lithium salt and an zwitterionic compound.

In one embodiment of the present invention, the aqueous solvent is at least one selected from the group consisting of ultra-pure water (DI water), 2-butoxy ethanol and iso-propyl alcohol (iso-propyl alcohol) In one embodiment of the present invention, the zwitterionic compound is a quaternary ammonium alkyl carboxylate compound represented by the following formula 1:

[Formula 1]

wherein $R_1$ to $R_3$ are each independently the same or different linear or branched alkyl groups.

In one embodiment of the present invention, the zwitterionic compound is betaine represented by the following Formula 2.

[Formula 2]

In one embodiment of the present invention, the lithium salt and zwitterionic compound are each present in an amount of 1 to 10 molal concentration (m).

In one embodiment of the present invention, the lithium salt and zwitterionic compound are each present in an amount of 3 to 10 molal concentration (m).

In one embodiment of the invention, the lithium salt and the zwitterionic compound are present in a molal concentration (m) ratio of 9:1 to 1:9.

In one embodiment of the invention, the lithium salt and the zwitterionic compound are present in a molal concentration (m) ratio of 2:1 to 1:2.

In one embodiment of the present invention, the lithium salt is comprised in an amount of 6 molal (m) concentration, the zwitterionic compound is comprised in an amount of 3 to 10 molar concentration (m).

In one embodiment of the present invention, the lithium salt is consisted of any one of Li(OH), $Li_2O$, $Li_2CO_3$, $Li_2SO_4$, $LiNO_3$ and $CH_3COOLi$.

In one embodiment of the present invention, the melting point of the electrolyte is less than −30° C.

In addition, the present invention provides a pseudo-capacitor comprising a positive electrode; a negative electrode; and an electrolyte described above.

According to the present invention, by providing a certain concentration, or more, of a lithium salt and a zwitterionic compound in an aqueous electrolyte, the freezing problem of the electrolyte in a cryogenic environment can be improved, and the specific capacitance, charging/discharging efficiency, energy density and power density of the pseudo-capacitor comprising this can be greatly improved.

DETAILED DESCRIPTION

Hereinafter, the present invention will be described in detail with reference to the accompanying drawings so that those skilled in the art may easily implement the present invention. However, the present invention may be embodied in many different forms and should not be construed as limited to the present specification.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The present invention provides an aqueous electrolyte for pseudo-capacitor comprising an aqueous solvent, a lithium salt and a zwitterionic compound.

Hereinafter, the present invention will be described in detail.

The aqueous electrolyte according to the present invention comprises an aqueous solvent as an electrolyte solution and also further comprises a lithium salt and a zwitterionic compound, and thus is prevented from freezing in a cryogenic environment, thereby enabling stable operation of the pseudo-capacitor comprising the electrolyte. Therefore, the capacitor including the electrolyte containing the aqueous solvent, lithium salt and zwitterionic compound can improve the low temperature stability and exhibit excellent charging/discharging efficiency, energy density and power density.

The aqueous solvent is not particularly limited, but at least one of ultra-pure water (DI water), 2-butoxy ethanol, and iso-propyl alcohol may be used.

The lithium salt is not particularly limited, but may be used without limitation as long as the lithium salt is applicable to pseudo-capacitor, and may be any one of Li(OH), $Li_2O$, $Li_2CO_3$, $Li_2SO_4$, $LiNO_3$ and $CH_3COOLi$, preferably $LiNO_3$.

The zwitterionic compound refers to a compound that is electrically positive and negative at the same time in the compound and thus is neutral, and is commonly referred to as 'zwitterion'.

The zwitterionic compound according to the present invention may be a quaternary ammonium alkyl carboxylate compound represented by Formula 1 below:

[Formula 1]

wherein $R_1$ to $R_3$ are each independently the same or different linear or branched alkyl groups.

The compound represented by Formula 1 may be a compound that is neutral in its entirety by forming a quaternary ammonium on one side to show a cationic property and having an anionic property of carboxylate at the other side at the same time.

The zwitterionic compound according to the present invention may preferably betaine represented by the following Formula 2 wherein $R_1$ to $R_3$ are all methyl ($—CH_3$)

[Formula 2]

In the case of betaine, the part containing quaternary ammonium shows a cationic property, and the part containing carboxylate group shows an anionic property at the same time, and thus betaine corresponds to a "zwitterion", which is neutral, based on the entire betaine molecule.

In order to improve the cryogenic stability of the aqueous electrolyte according to the present invention, the lithium salt and zwitterionic compound may be provided in an amount of 1 to 10 molal concentration (m), preferably in an amount of 3 to 10 molal (m) concentration, more preferably in an amount of 3 to 6 molal concentration (m), based on the aqueous electrolyte. In addition, in one embodiment of the present invention, the lithium salt is provided in an amount of 6 molal concentration (m) based on the aqueous electrolyte, the zwitterionic compound is provided in an amount of 3 molal concentration (m), based on the aqueous electrolyte. If the concentration of the lithium salt and zwitterionic compound is less than the above range, low temperature stability may not be sufficiently secured. If the concentration of the lithium salt and the zwitterionic compound exceeds the above range, there is a problem that the lithium salt and zwitterionic compound are not sufficiently dissolved in the electrolyte. Therefore, it is preferable that the concentrations of the lithium salt and the zwitterionic compound satisfy the above range.

In the case of betaine which is a zwitterionic compound according to an embodiment of the present invention, due to the structural characteristics of the betaine having the structure of zwitterion, one side which has the charge surrounds the cluster of water molecules, and the cluster of water molecules surrounded by the betaine in this way are reduced in bonding strength with each other and thus have a so-called 'water cluster in salt' structure, so that the effect of preventing freezing of the aqueous electrolyte even in a cryogenic environment is shown. Here, the structure of 'water in salt' refers to the principle that the excess salt is added to the electrolyte, thereby interfering with the bonds between the water molecules to prevent the freezing of the water and thus reducing the activity of the water and inhibiting the decomposition of water, so that the effect of increasing the driving voltage range of the capacitor may be exhibited.

In a case where the amount of lithium salt is fixed, If the concentration of the zwitterionic compound is 1 molal concentration (m) or less, the low temperature stability may be reduced due to insufficient enclosing of the cluster of water molecules. If the concentration of the zwitterionic compound exceeds 10 molal concentration (m), it may not be sufficiently dissolved in aqueous electrolyte, and also ionic conductivity of aqueous electrolytes may be reduced. Therefore, the concentration of the zwitterionic compound is properly adjusted within the above range.

The lithium salt and the zwitterionic compound may be provided in a molal concentration (m) ratio of 9:1 to 1:9, preferably in the molal concentration (m) ratio of 2:1 to 1:9, more preferably in the molal concentration (m) ratio of 2:1 to 3:5. In one embodiment of the present invention, the lithium salt and the zwitterionic compound are provided in a molal concentration (m) ratio of 2:1.

If the molal concentration (m) ratio of the lithium salt and the zwitterionic compound exceeds the above range, there is a problem that the electrochemical performance of the capacitor is greatly reduced. If the molal concentration (m) ratio of the lithium salt and the zwitterionic compound is less than the above range, there is a problem that the electrolyte can be frozen in the cryogenic environment. Therefore, it is preferable that the molal concentration (m) ratio of the lithium salt and the zwitterionic compound satisfy the above range.

The aqueous electrolyte according to the present invention comprises the lithium salt and the zwitterionic compound in concentrations and ratios as described above to prevent freezing of the aqueous electrolyte in a cryogenic environment. Therefore, the melting point of the electrolyte may be −30° C. or less, and also the pseudo-capacitor containing the electrolyte also has the advantage that can be stably operated in cryogenic environment of −30° C. or less.

The pseudo-capacitor according to the present invention may be composed of a first current collector, a first electrode, an electrolyte, a separator, a second electrode, a second current collector, and a case. Since the first current collector, the electrolyte, the separator, the second current collector, and the case may use a known technology, a detailed description thereof will be omitted.

Hereinafter, the present invention will be described in more detail with reference to examples and the like. However, it should not be construed that the scope and contents of the present invention are reduced or limited by the following examples and the like. Also, if it is based on the disclosure of the present invention comprising the following examples, it will be apparent that those skilled in the art can easily carry out the present invention that does not specifically present the experimental results, and that such variations and modifications fall within the scope of the appended claims.

Example 1: Preparation of Aqueous Electrolyte

An aqueous electrolyte for a pseudo-capacitor was prepared by dissolving 6 molal concentration (m) of $LiNO_3$ (Junsei company) as a lithium salt, and 3 molal concentration (m) of betaine (($CH_3$)$_3N^+CH_2CO_2^-$, Sigma-Aldrich company) as a zwitterionic compound, based on 50 ml of ultra-pure water (DI Water), and stirring them for 30 minutes.

Example 2: Preparation of Aqueous Electrolyte

An aqueous electrolyte for a pseudo-capacitor was prepared by dissolving 6 molal concentration (m) of each of $LiNO_3$ (Junsei company) as a lithium salt, and betaine (($CH_3$)$_3N^+CH_2CO_2^-$, Sigma-Aldrich company) as a zwitterionic compound, based on 50 ml of ultra-pure water (DI Water), and stirring them for 30 minutes.

Example 3: Preparation of Aqueous Electrolyte

An aqueous electrolyte for a pseudo-capacitor was prepared by dissolving 6 molal concentration (m) of $LiNO_3$ (Junsei company) as a lithium salt, and 10 molal concentration (m) of betaine (($CH_3$)$_3N^+CH_2CO_2^-$, Sigma-Aldrich company) as a zwitterionic compound, based on 50 ml of ultra-pure water (DI Water), and stirring them for 30 minutes.

Example 4: Preparation of Aqueous Electrolyte

An aqueous electrolyte for a pseudo-capacitor was prepared by dissolving 3 molal concentration (m) of $LiNO_3$ (Junsei company) as a lithium salt, and 6 molal concentration (m) of betaine (($CH_3$)$_3N^+CH_2CO_2^-$, Sigma-Aldrich company) as a zwitterionic compound, based on 50 ml of ultra-pure water (DI Water), and stirring them for 30 minutes.

Comparative Example 1: Preparation of Aqueous Electrolyte

An aqueous electrolyte for a pseudo-capacitor was prepared in the same manner as in Example 2, except that 2 molal concentration (m) of $LiNO_3$ as a lithium salt is used.

Comparative Example 2: Preparation of Aqueous Electrolyte

An aqueous electrolyte for a pseudo-capacitor was prepared, which contains only 2 molal concentration (m) of $LiNO_3$ as a lithium salt based on 50 ml of ultra-pure water (DI Water), while not containing the zwitterionic compound.

Comparative Example 3: Preparation of Aqueous Electrolyte

An aqueous electrolyte for a pseudo-capacitor was prepared in the same manner as in Example 1, except that the following choline bicarbonate instead of betaine (($CH_3$)$_3N^+CH_2CO_2^-$, Sigma-Aldrich company) as a zwitterionic compound is used:

Comparative Example 4: Preparation of Aqueous Electrolyte

An aqueous electrolyte for a pseudo-capacitor was prepared in the same manner as in Example 1, except that the following L-alanine instead of betaine (($CH_3$)$_3N^+CH_2CO_2^-$, Sigma-Aldrich company) as a zwitterionic compound is used:

Comparative Example 5: Preparation of Aqueous Electrolyte

An aqueous electrolyte for a pseudo-capacitor was prepared in the same manner as in Example 1, except that 1 molal concentration (m) of the following L-histidine instead of betaine (($CH_3$)$_3N^+CH_2CO_2^-$, Sigma-Aldrich company) as a zwitterionic compound is dissolved:

Table 1 summarizes the additives and the contents of the aqueous electrolyte for pseudo-capacitor.

TABLE 1

| | Aqueous electrolyte additive | | | |
|---|---|---|---|---|
| | Ultra-pure water (DI Water, ml) | Lithium salt ($LiNO_3$) (molal concentration (m)) | Zwitterionic compound | Molal concentration (m) |
| Example 1 | 50 | 6 | betaine1 | 3 |
| Example 2 | 50 | 6 | betaine1 | 6 |

TABLE 1-continued

| | Aqueous electrolyte additive | | | |
|---|---|---|---|---|
| | Ultra-pure water (DI Water, ml) | Lithium salt (LiNO$_3$) (molal concentration (m)) | Zwitterionic compound | Molal concentration (m) |
| Example 3 | 50 | 6 | betaine1 | 10 |
| Example 4 | 50 | 3 | betaine1 | 6 |
| Comparative Example 1 | 50 | 2 | betaine1 | 6 |
| Comparative Example 2 | 50 | 2 | — | — |
| Comparative Example 3 | 50 | 6 | choline bicarbonate | 3 |
| Comparative Example 4 | 50 | 6 | L-alanine | 3 |
| Comparative Example 5 | 50 | 6 | L-histidine | 1 |

(1: betaine $(CH_3)_3N^+CH_2CO_2^-$)

Experimental Example 1: Evaluation of the Electrochemical Characteristics of Pseudo-Capacitor After preparing the pseudo-capacitor of the three-electrode mode for the aqueous electrolytes of Examples 1 to 4 and Comparative Examples 1 to 5, a cyclic voltammetry (Bio-Logics company VSP/VMP 3) was used to measure their physical properties in the following manner, and the results are shown in FIGS. 1 to 3, 5 to 10, 12 to 15 and Table 2. The measurements were taken according to different scanning rates in the aqueous electrolytes of Examples 1 to 4 and Comparative Examples 1 to 5 while using a positive electrode containing LiMn$_2$O$_4$ as a working electrode, a platinum plate as a counter electrode, and Ag/AgCl as a reference electrode (1) 3-Electrode Measurement Cyclic voltammetry was used to measure the positive electrode under voltage −0.2 to 1.1V, 10 mV/sec and 1 mV/sec.

(2) 2-Electrode Measurement

LiMn$_2$O$_4$ was used as the working electrode and LiTi$_2$(PO$_4$)$_3$ was used as the counter and reference electrode.

Cyclic voltammetry was used to measure under voltage 0.3 to 2.1V and 10 mV/sec.

A constant-current discharging method was used to measure under the charging/discharging condition (constant current of 1.398 mA and voltage of 0.3 to 2.1V).

For the aqueous electrolytes of Examples 1 to 4 and Comparative Examples 3 to 5, the results of the 3-electrode measurement measured under the conditions of 10 mV/sec and 1 mV/sec as described above are shown in Table 2 below.

TABLE 2

| | Discharging capacity (F/g) 10 mV/s | Discharging energy (Wh/kg) 10 mV/s | Discharging capacity (F/g) 1 mV/s | Discharging energy (Wh/kg) 1 mV/s |
|---|---|---|---|---|
| Example 1 | 314.82 | 108.80 | 340.60 | 121.85 |
| Example 2 | 271.09 | 86.28 | 329.29 | 115.27 |
| Example 3 | 270.21 | 83.09 | 319.86 | 110.98 |
| Example 4 | 294.41 | 91.12 | 305.56 | 103.56 |
| Comparative Example 3 | 337.43 | 99.78 | 475.02 | 84.74 |
| Comparative Example 4 | 369.44 | 96.55 | 363.82 | 55.46 |
| Comparative Example 5 | 300.95 | 80.11 | 198.81 | 23.55 |

It can be seen that the electrolytes according to Examples 1 to 4 generally have excellent discharging capacity and energy density. In addition, it was found that in case of using the electrolyte according to Example 2, the power density, discharging capacity, specific capacitance and energy density are excellent overall, as compared to Comparative Example 1 in which the lithium salt concentration (2 molal concentration (m)) is low and the molal concentration (m) ratio of lithium salt and zwitterionic compound (1:3) is high. Also, in the case of Comparative Example 2, the results of the power density, discharging capacity, specific capacitance and energy density were similar to those of the electrolyte according to Example 2. However, as will be described later, when the freezing experiment was performed at −30° C., the aqueous electrolyte was frozen in the cryogenic environment (−30° C.), resulting in poor cryogenic operation characteristics. Therefore, it was confirmed that aqueous electrolytes of Comparative Examples 1 and 2 are not suitable as an aqueous electrolyte of a pseudo-capacitor.

From this, it can be seen that if the molal concentration (m) ratio of lithium salt and zwitterionic compound is out of the molal concentration (m) ratio of 2:1 to 1:2, it is not suitable as an aqueous electrolyte of a pseudo-capacitor.

Meanwhile, it was confirmed that the aqueous electrolytes of Comparative Examples 3 to 5 using Choline bicarbonate (Comparative Example 3), L-alanine (Comparative Example 4) and L-histidine (Comparative Example 5) which are similar to the compounds represented by Formulas 1 and 2 according to the present invention but has a different structure are also not suitable as an aqueous electrolyte for a pseudo-capacitor.

Specifically, it was confirmed that in the case of Comparative Example 3, the discharging capacity appears to be high due to the redox peak caused by the side reaction, but the energy density is relatively very low, resulting in poor electrochemical characteristics, and it is not suitable as an aqueous electrolyte for a pseudo-capacitor due to the occurrence of the problem of precipitation of lithium salt and choline bicarbonate during the measurement. Also, it was confirmed that even in the case of Comparative Example 4, the discharging capacity seems to be high, but the energy density is relatively very low, so the electrochemical characteristics are poor, and thus it is not suitable as an aqueous electrolyte for a pseudo-capacitor. Also, it was confirmed that in the case of Comparative Example 5, both the discharging capacity and the energy density are low as compared to the examples according to the present invention, and in particular, L-histidine has low solubility in an aqueous solvent and does not dissolve by more than 1 molal concentration (m), and thus it is not suitable as an aqueous electrolyte for a pseudo-capacitor.

Experimental Example 2: Evaluation of Cryogenic Operation Characteristic of Pseudo-Capacitor A glassy carbon electrode was used to manufacture a pseudo-capacitor comprising a positive electrode containing LiMn$_2$O$_4$, a negative electrode containing LiTi$_2$(PO$_4$)$_3$, and aqueous electrolytes of Example 2 and Comparative Examples 1 and 2, and the operation characteristics of the capacitors in the cryogenic (−30° C.) environment were evaluated.

Figure 1:
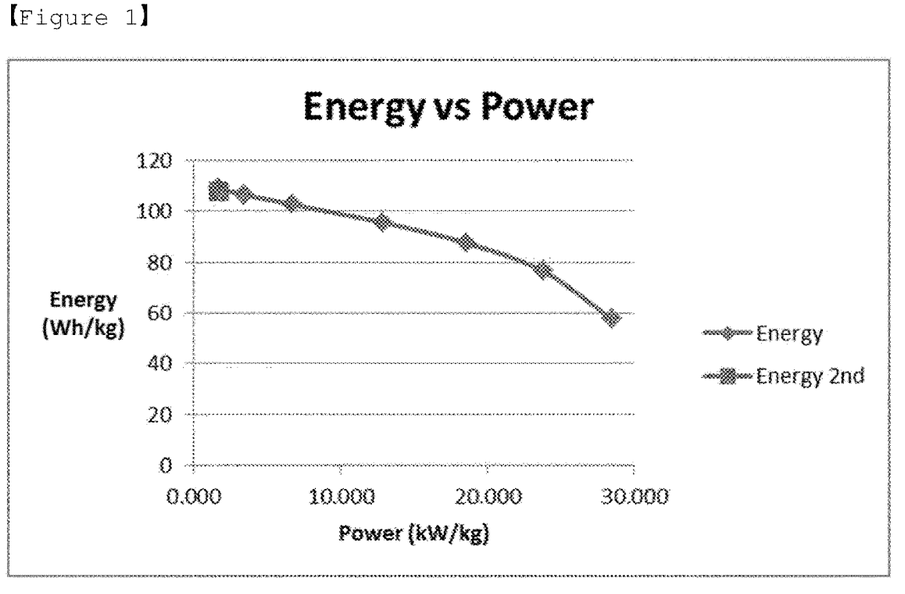
FIG. 1 shows a Ragone Plot measured by a three-electrode method for the electrolyte according to Example 2 of the present invention for $LiMn_2O_4$ (positive electrode).
Figure 2:
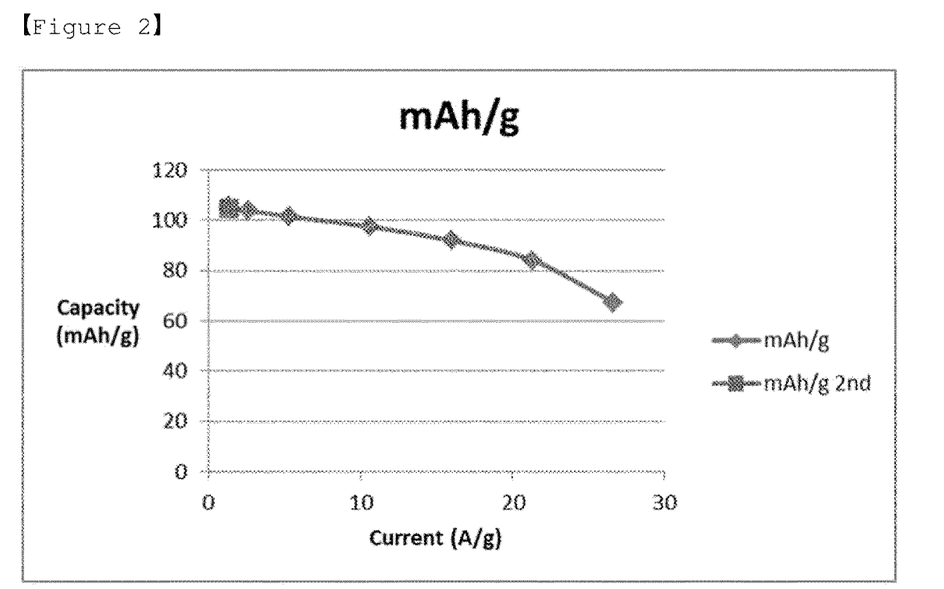
FIG. 2 shows a discharging capacity measured by a three-electrode method for the electrolyte according to Example 2 of the present invention for $LiMn_2O_4$ (positive electrode).
Figure 3:
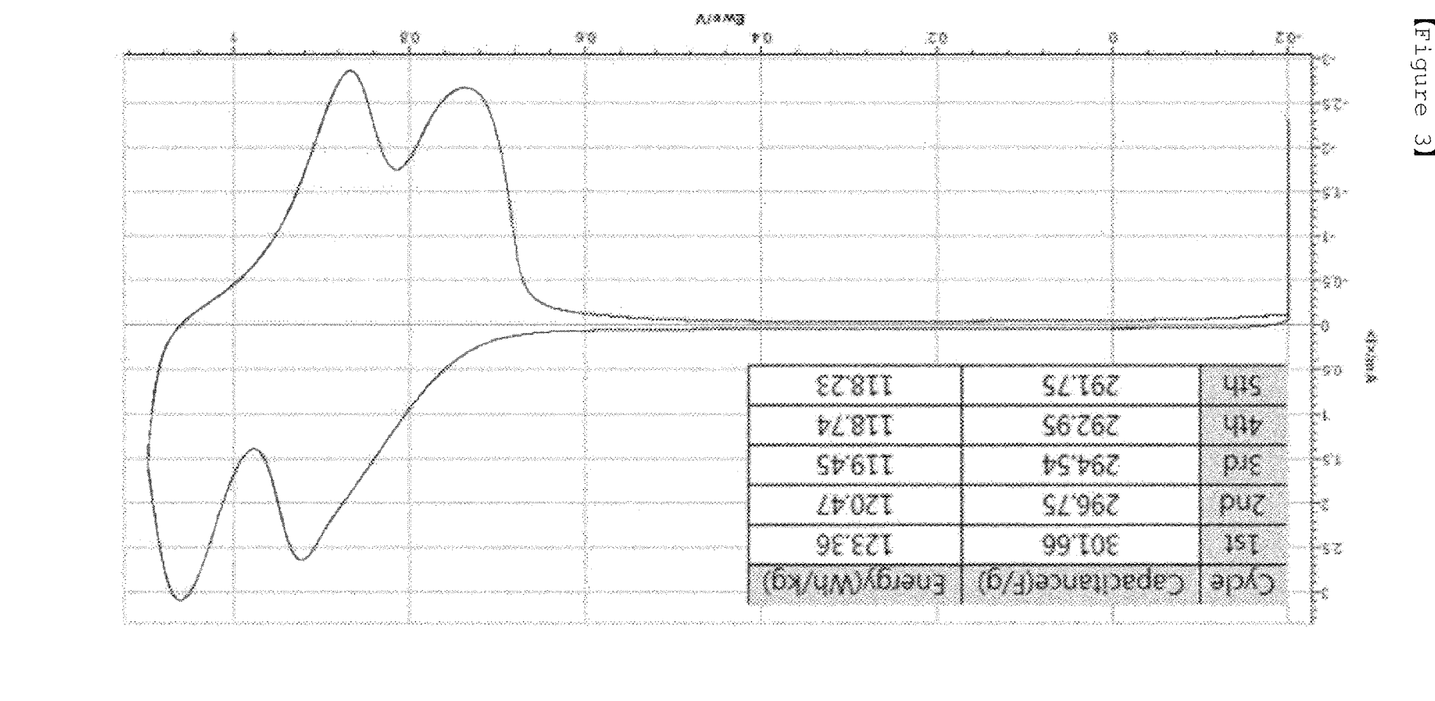
FIG. 3 shows a specific capacitance, energy density and cyclic voltammogram (CV curve) measured by a three-electrode method for the electrolyte according to Example 2 of the present invention for $LiMn_2O_4$ (positive electrode).
Figure 4:
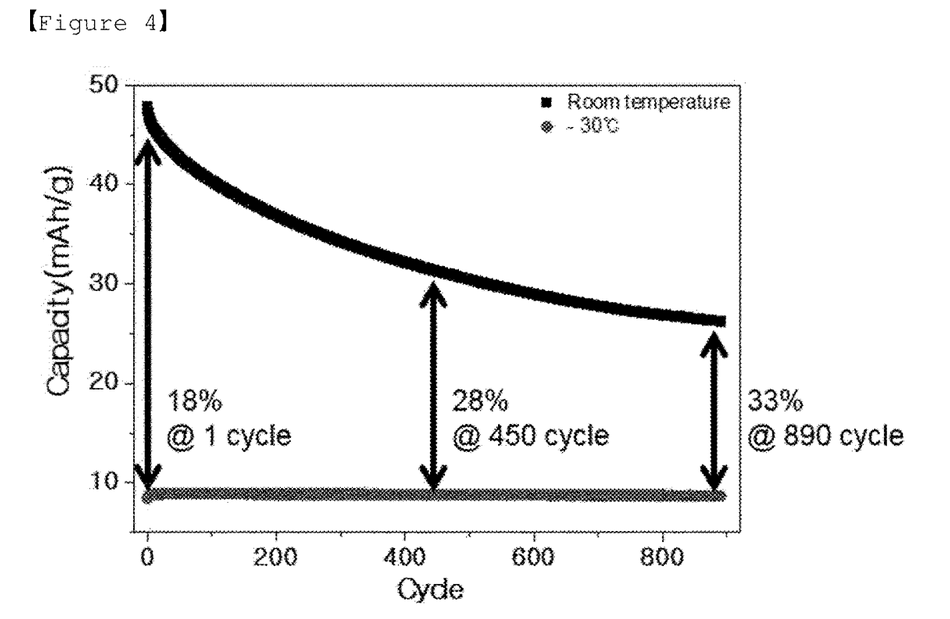
FIG. 4 shows a lifetime characteristic measured by a two-electrode method for a full-cell capacitor (on glassy carbon electrode) consisting of electrolyte according to Example 2 of the present invention, $LiMn_2O_4$ (positive electrode) and $LiTi_2(PO_4)_3$ (negative electrode).
Figure 5:
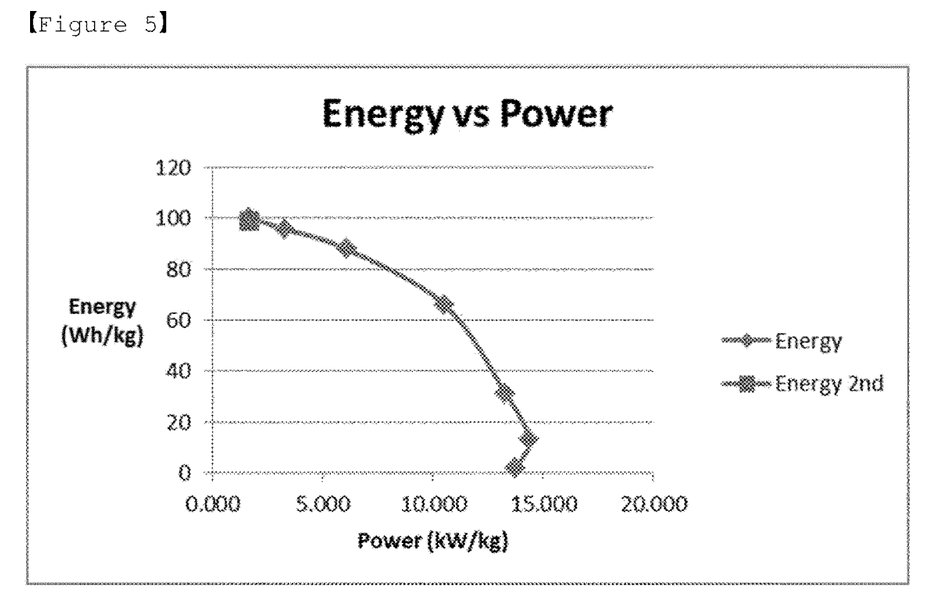
FIG. 5 shows a Ragone Plot measured by a three-electrode method for the electrolyte according to Comparative Example 1 of the present invention for $LiMn_2O_4$ (positive electrode).
Figure 6:
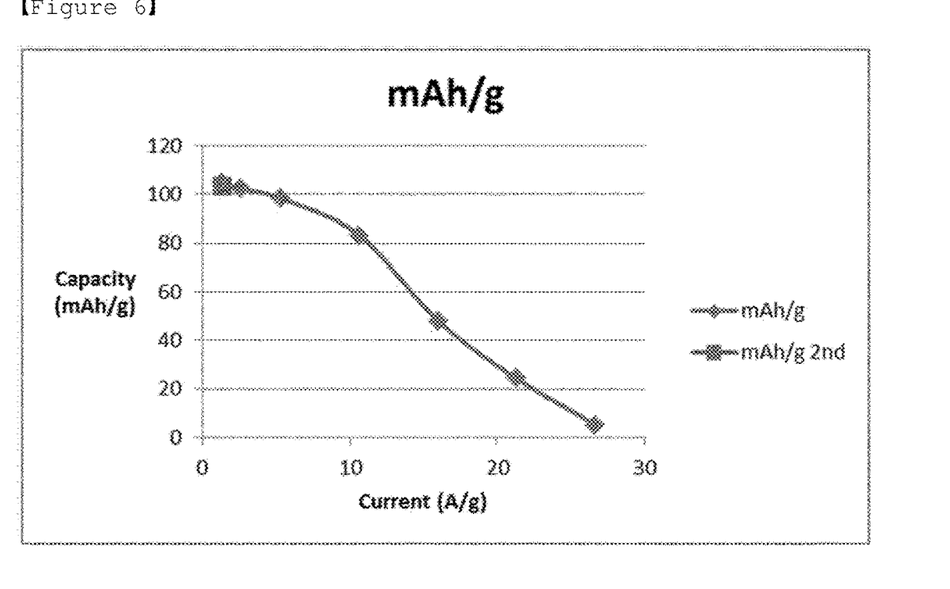
FIG. 6 shows a discharging capacity measured by a three-electrode method for the electrolyte according to Comparative Example 1 of the present invention for $LiMn_2O_4$ (positive electrode).
Figure 7:
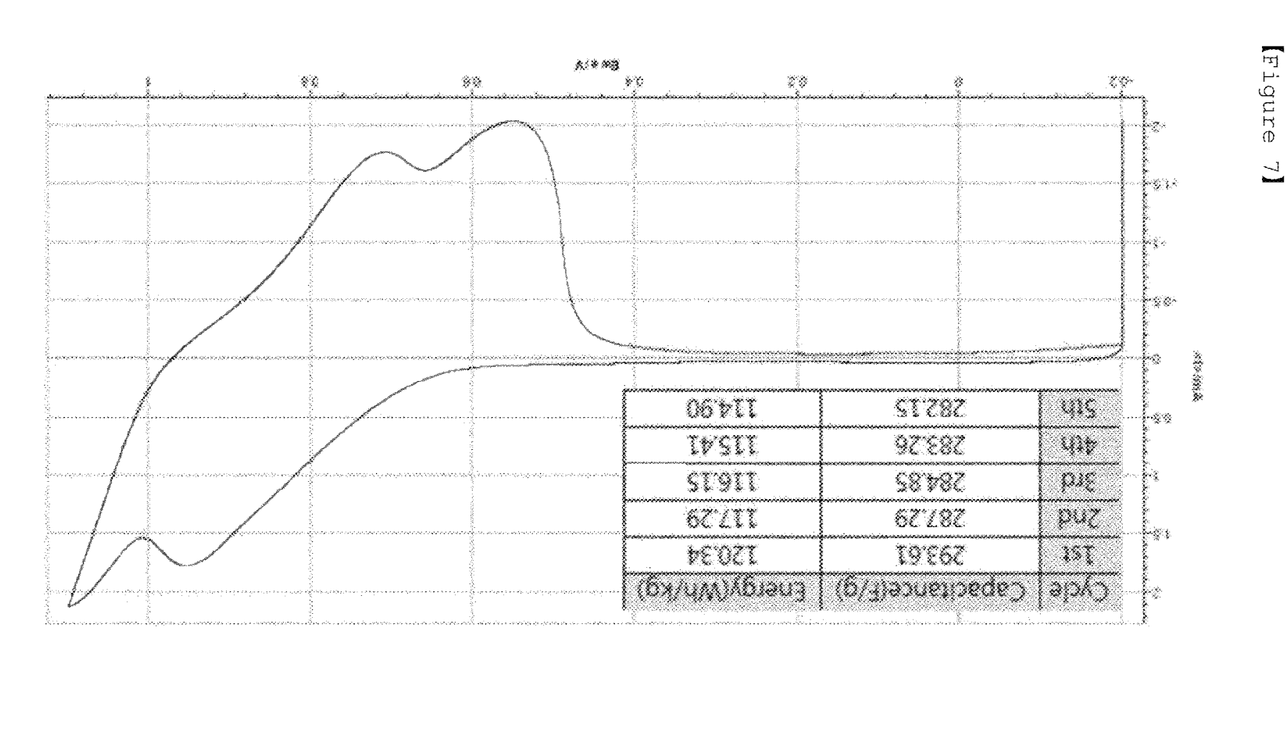
FIG. 7 shows a specific capacitance, energy density and cyclic voltammogram (CV curve) measured by a three-electrode method for the electrolyte according to Comparative Example 1 of the present invention for $LiMn_2O_4$ (positive electrode).
Figure 8:
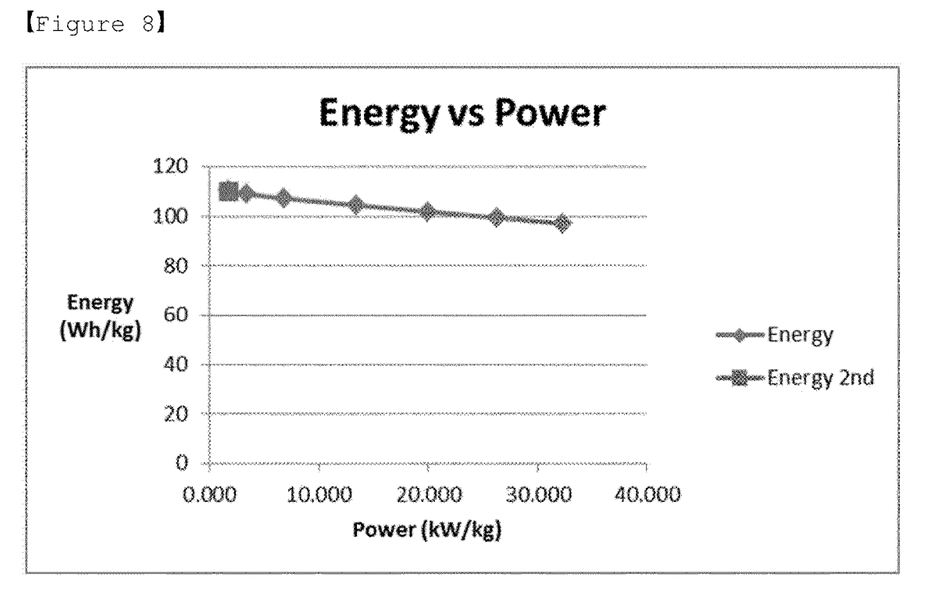
FIG. 8 shows a Ragone Plot measured by a three-electrode method for the electrolyte according to Comparative Example 2 of the present invention for $LiMn_2O_4$ (positive electrode).
Figure 9:
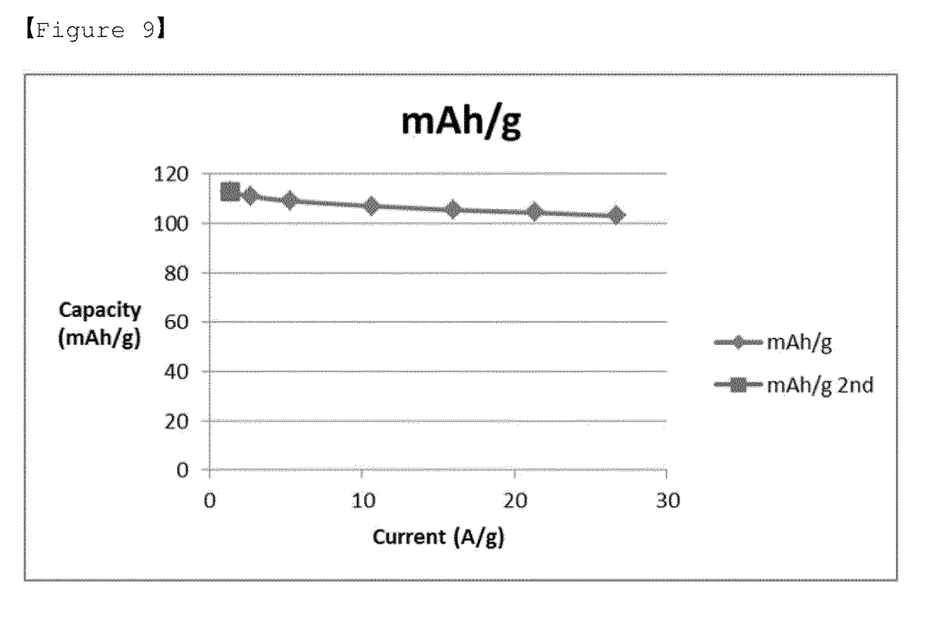
FIG. 9 shows a discharging capacity measured by a three-electrode method for the electrolyte according to Comparative Example 2 of the present invention for $LiMn_2O_4$ (positive electrode).
Figure 10:
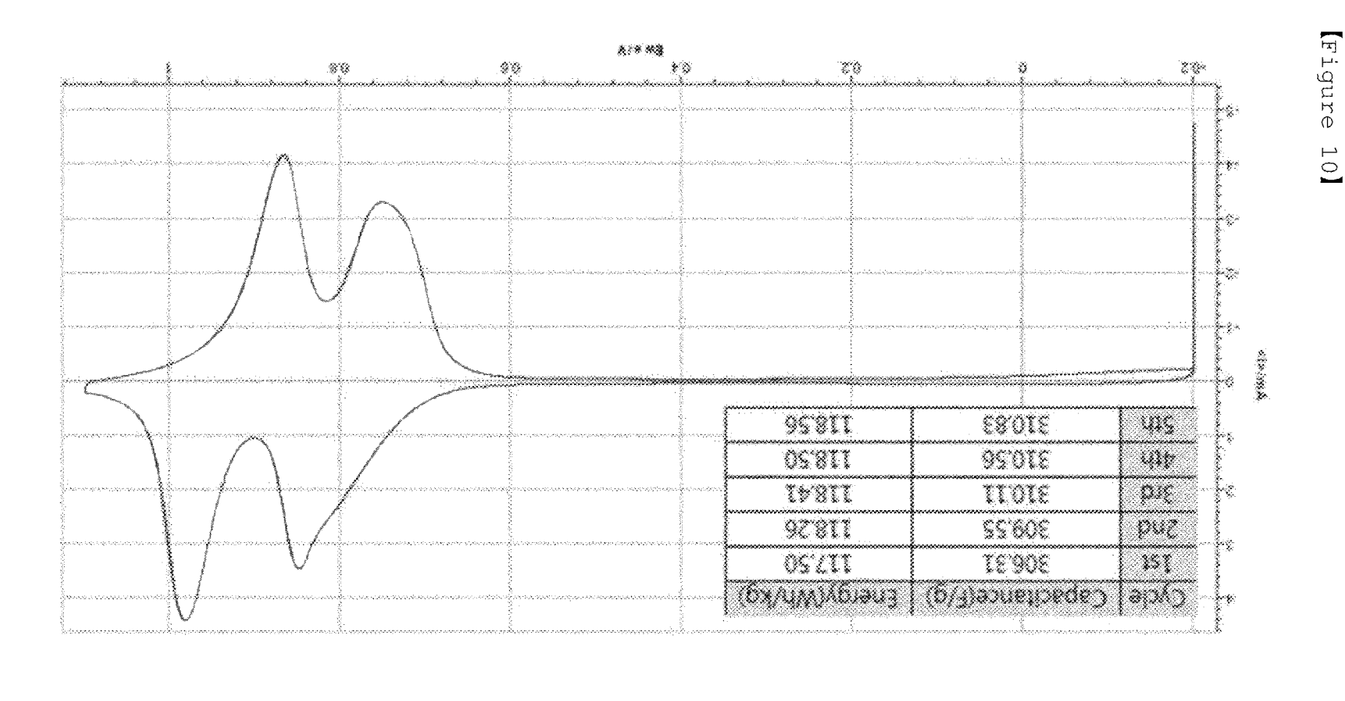
FIG. 10 shows a specific capacitance, energy density and cyclic voltammogram (CV curve) measured by a three-electrode method for the electrolyte according to Comparative Example 2 of the present invention for $LiMn_2O_4$ (positive electrode).

Referring to FIG. 4, it was confirmed that in the case of pseudo-capacitor comprising an aqueous electrolyte according to Example 2, long lifetime stability is maintained even in a cryogenic environment, whereas it was confirmed that in the case of Comparative Example 1, the aqueous electrolyte did not freeze in the cryogenic environment, but the result of the constant current measurement is not very good as shown in FIGS. 5 and 6, due to the inclusion of a small proportion of lithium salt (LiNO$_3$) relative to betaine.

Figure 11:
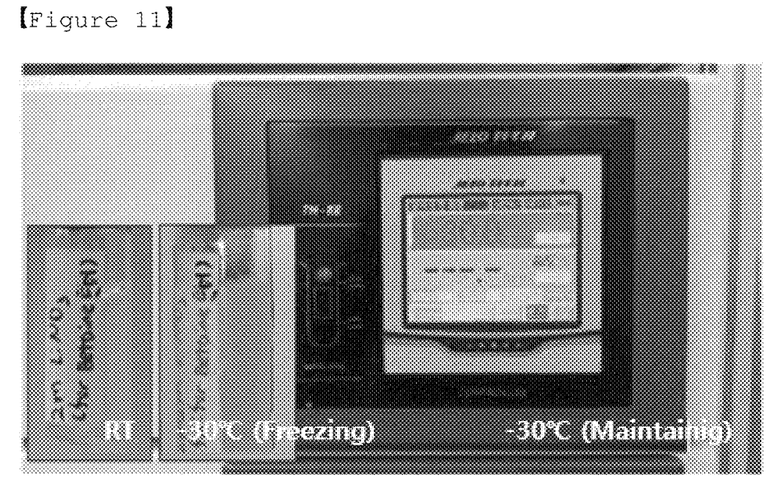
FIG. 11 shows the image of the result of the cryogenic freezing experiment of the electrolyte according to Comparative Example 2 of the present invention.
Figure 12:
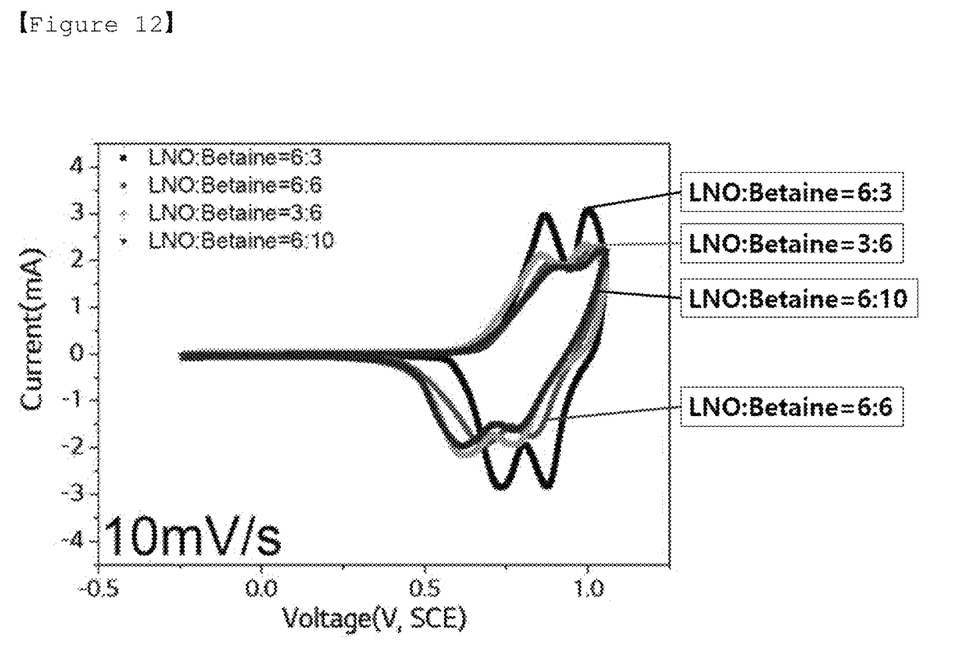
FIG. 12 shows a cyclic voltammogram (CV curve) measured by a three-electrode method for electrolytes according to Examples 1 to 4 of the present invention for $LiMn_2O_4$ (positive electrode) under a condition of 10 mV/sec.
Figure 13:
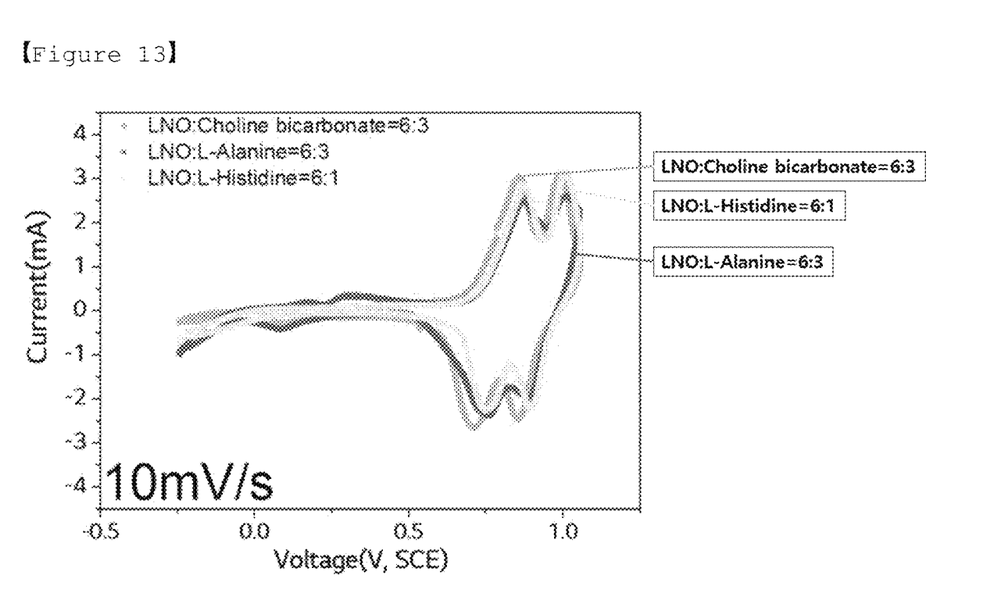
FIG. 13 shows a cyclic voltammogram (CV curve) measured by a three-electrode method for electrolytes according to Comparative Examples 3 to 5 of the present invention for $LiMn_2O_4$ (positive electrode) under a condition of 10 mV/sec.
Figure 14:
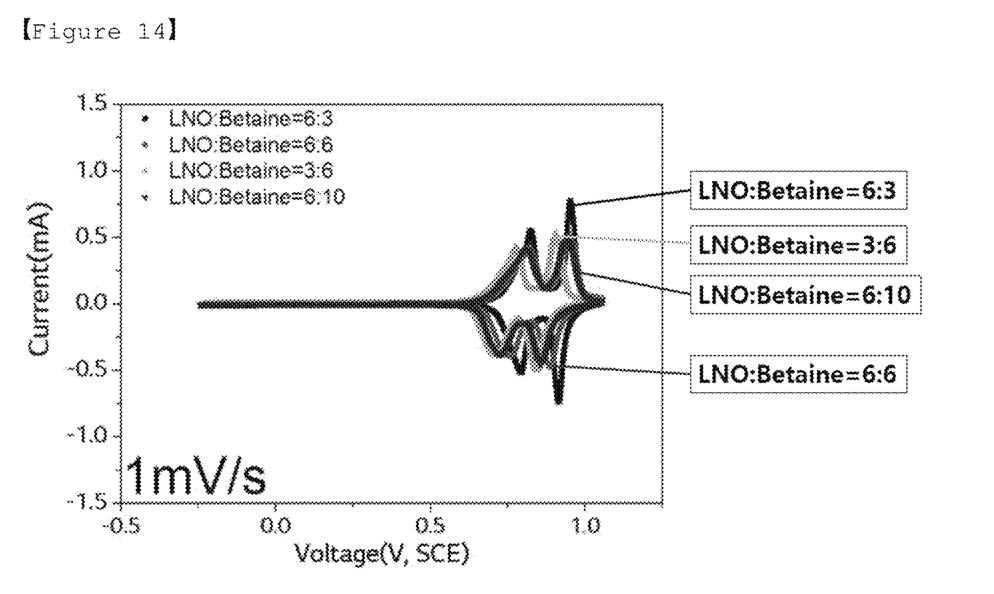
FIG. 14 shows a cyclic voltammogram (CV curve) measured by a three-electrode method for electrolytes according to Examples 1 to 4 of the present invention for $LiMn_2O_4$ (positive electrode) under a condition of 1 mV/sec.
Figure 15:
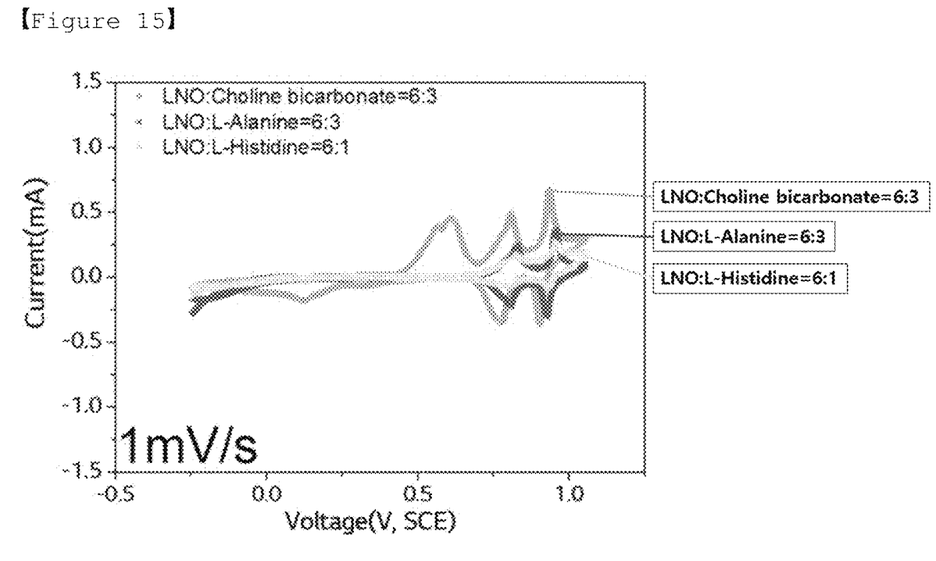
FIG. 15 shows a cyclic voltammogram (CV curve) measured by a three-electrode method for electrolytes according to Comparative Examples 3 to 5 of the present invention for $LiMn_2O_4$ (positive electrode) under a condition of 1 mV/sec.

It was confirmed that in the case of Comparative Example 2, since the aqueous electrolyte contained only lithium salt (LiNO$_3$) without containing betaine, the aqueous electrolyte was frozen in the cryogenic environment as a result of the freezing experiment at −30° C. (JEIO TECH company TH-KE Temperature & Humidity Chamber). (FIG. 11)

Experimental Example 3: Measurement and Evaluation of Ion Conductivity of Aqueous Electrolyte The ion conductivity of the aqueous electrolytes prepared in Examples 1 to 4 and Comparative Examples 1 to 5 were measured by an ion conductivity meter (Mettler Toledo company), and the results are shown in Table 3 below.

TABLE 3

|  | Ion conductivity (mS/cm) |
| --- | --- |
| Example 1 | 79.69 |
| Example 2 | 43.09 |
| Example 3 | 32.30 |
| Example 4 | 17.89 |
| Comparative Example 1 | 23.51 |
| Comparative Example 2 | 108.4 |
| Comparative Example 3 | 106.8 |
| Comparative Example 4 | 85.14 |
| Comparative Example 5 | 115.8 |

Referring to Table 3, it was confirmed that the aqueous electrolytes prepared in Examples 1 to 4 show excellent ion conductivity despite the high content of lithium salts and zwitterionic compounds.

Through the above examples and experimental examples, it was confirmed that a pseudo-capacitor which exhibits excellent power density, discharging capacity, specific capacitance, ion conductivity, energy density and long lifetime stability even in a cryogenic environment can be produced by providing a pseudo-capacitor using the aqueous electrolyte of the present invention.

The invention claimed is:

1. An aqueous electrolyte comprising an aqueous solvent, a lithium salt and a zwitterionic compound wherein the lithium salt and the zwitterionic compound are each contained in an amount of 1 to 10 molal concentration (m).

2. The aqueous electrolyte according to claim 1, wherein the aqueous solvent is at least one selected from the group consisting of ultra-pure water (DI water), 2-butoxy ethanol and iso-propyl alcohol.

3. The aqueous electrolyte according to claim 1, wherein the zwitterionic compound is a quaternary ammonium alkyl carboxylate compound represented by Formula 1 below:

[Formula 1]

wherein R$_1$ to R$_3$ are each independently the same or different linear or branched alkyl groups.

4. The aqueous electrolyte according to claim 1, wherein the zwitterionic compound is betaine represented by Formula 2 below:

[Formula 2]

5. The aqueous electrolyte according to claim 1, wherein the lithium salt and the zwitterionic compound are each present in an amount of 3 to 10 molal concentration (m).

6. The aqueous electrolyte according to claim 5, wherein the lithium salt and zwitterionic compound are present in a molal concentration (m) ratio of 9:1 to 1:9.

7. The aqueous electrolyte according to claim 5, wherein the lithium salt and zwitterionic compound are present in a molal concentration (m) ratio of 2:1 to 1:2.

8. The aqueous electrolyte according to claim 1, wherein the lithium salt is present in an amount of 6 molal concentration (m), and the zwitterionic compound is present in an amount of 3 to 10 molal concentration (m).

9. The aqueous electrolyte according to claim 1, wherein the lithium salt is any one of Li(OH), Li$_2$O, LiCO$_3$, Li$_2$SO$_4$, LiNO$_3$ and CH$_3$COOLi.

10. The aqueous electrolyte according to claim 1, wherein the electrolyte has a freezing point of −30° C. or less.

11. A pseudo-capacitor comprising a positive electrode; negative electrode; and the electrolyte according to claim 1.

* * * * *